United States Patent
Ahuja et al.

(10) Patent No.: US 10,666,617 B2
(45) Date of Patent: May 26, 2020

(54) INTERCEPTING NETWORK TRAFFIC ROUTED BY VIRTUAL SWITCHES FOR SELECTIVE SECURITY PROCESSING

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US)

(73) Assignee: ShieldX Networks, Inc., San Jose, CA (US)

( * ) Notice: Subject to any disclaimer, the term of this patent is extended or adjusted under 35 U.S.C. 154(b) by 79 days.

(21) Appl. No.: 15/396,625

(22) Filed: Dec. 31, 2016

(65) Prior Publication Data

US 2018/0191680 A1 Jul. 5, 2018

(51) Int. Cl.
| | |
|---|---|
| H04L 29/06 | (2006.01) |
| H04L 12/26 | (2006.01) |
| H04L 12/931 | (2013.01) |
| G06F 9/455 | (2018.01) |
| H04L 12/46 | (2006.01) |

(52) U.S. Cl.
CPC ........ *H04L 63/0254* (2013.01); *H04L 43/028* (2013.01); *H04L 49/70* (2013.01); *H04L 63/0236* (2013.01); *H04L 63/0245* (2013.01); *H04L 63/0272* (2013.01); *H04L 63/1408* (2013.01); *H04L 63/304* (2013.01); *H04L 63/306* (2013.01); *G06F 2009/45587* (2013.01); *G06F 2009/45595* (2013.01); *H04L 12/4641* (2013.01)

(58) Field of Classification Search
None
See application file for complete search history.

(56) References Cited

U.S. PATENT DOCUMENTS

2014/0115578 A1\* 4/2014 Cooper ................ G06F 21/606
718/1
2016/0294866 A1\* 10/2016 Mihelich ............. H04L 63/0218

OTHER PUBLICATIONS

International Search Report and Written Opinion for Application No. PCT/US2017/069089, dated Mar. 8, 2018, 12 pages.
Toffetti G., et al., "An Architecture for Self-managing Microservices," International Workshop on Automated Incident Management in Cloud (AIMC'15), in conjunction with EuroSys'15, The European Conference on Computer Systems, Apr. 21, 2015, pp. 19-23.

\* cited by examiner

*Primary Examiner* — Andrew J Steinle
(74) *Attorney, Agent, or Firm* — Nicholson de Vos Webster & Elliott LLP

(57) ABSTRACT

Systems, methods, and apparatuses enable an interface microservice to intercept and filter network traffic generated by virtual machines (VMs) and routed by a virtual switch (vSwitch). A vSwitch receiving network packets from the VMs is configured to route network packets to the interface microservice via a generated VLAN trunk. The interface microservice can retrieve and apply stored packet filters to the network packets intercepted by the microservice. If an intercepted network packet matches any of the applied packet filters, the interface microservice can perform various security operations, send the network packets to another microservice for security processing, or perform any other operations. For network packets which do not match a packet filter, the interface microservice forwards the packets to the originally intended destination.

21 Claims, 15 Drawing Sheets

INTERCEPTING NETWORK TRAFFIC ROUTED BY VIRTUAL SWITCHES FOR SELECTIVE SECURITY PROCESSING

TECHNICAL FIELD

Embodiments relate generally to computer network security. More specifically, embodiments relate to techniques for intercepting network traffic routed by virtual switches and filtering the intercepted traffic for the selective application of security services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

The vast majority of organizations today rely on computer systems and networks for an increasingly wide variety of business operations. As the reliance on these systems and networks has grown, so too has the importance of securing those computer systems and networks against internal and external security threats. However, the breadth and complexity of security threats targeting such computer systems and networks is far and wide and ever growing. To monitor and address these security threats, organizations increasingly rely on sophisticated computer network security applications and hardware such as firewalls, anti-virus tools, data loss prevention software, etc.

One aspect of a network security application often involves monitoring and performing security operations on network traffic generated by monitored components of a computing environment. For example, a security application might use deep packet inspection (DPI) operations, data loss prevention (DLP) operations, and other services to analyze network traffic for the presence of potential security threats. In computing environments which include virtualized computing resources, for example, the network traffic to be monitored can include traffic generated by virtual machines (VMs) and applications running thereon.

Computing environments including VMs may further include one or more virtual switches (also referred to herein as a "vSwitch"), where a vSwitch manages network traffic for some number of VMs connected to virtualized ports of the vSwitch and forming one or more virtual local area networks (VLANs). The configuration of vSwitch can also include port groups, where a port group is a logical grouping of vSwitch ports (and by extension the VMs connected to those ports). Furthermore, port groups of a vSwitch can be assigned a trunk group, where a trunk group merges a group of virtual network links into a single logical link and can enable VLANs to span across different vSwitches.

While the ability to assign vSwitch ports to port groups and trunk groups can enable efficiencies in managing network traffic at the vSwitch, these configurations also present challenges for examining traffic routed by a vSwitch for security purposes. For example, assume a web application running on a first VM accesses a SQL server running on a second VM accessible via a network routed by a vSwitch. In this example, a network administrator might desire to monitor and perform security operations on network traffic sent by the VM to the SQL server (e.g., for possible instances of SQL injection attacks or other database-related threats), but to ignore other types of network traffic sent from the VM and from other VMs on a same VLAN. If the VLAN is assigned to a trunk group (where the links of the trunk group are treated a single logical link), then a security application can perform such security processing by routing the trunk group traffic through the security application. However, performing security processing on the trunk group traffic can involve processing a significant amount of traffic from other VMs and applications which are irrelevant to the SQL traffic for the VM of interest.

DETAILED DESCRIPTION

Figure 1:
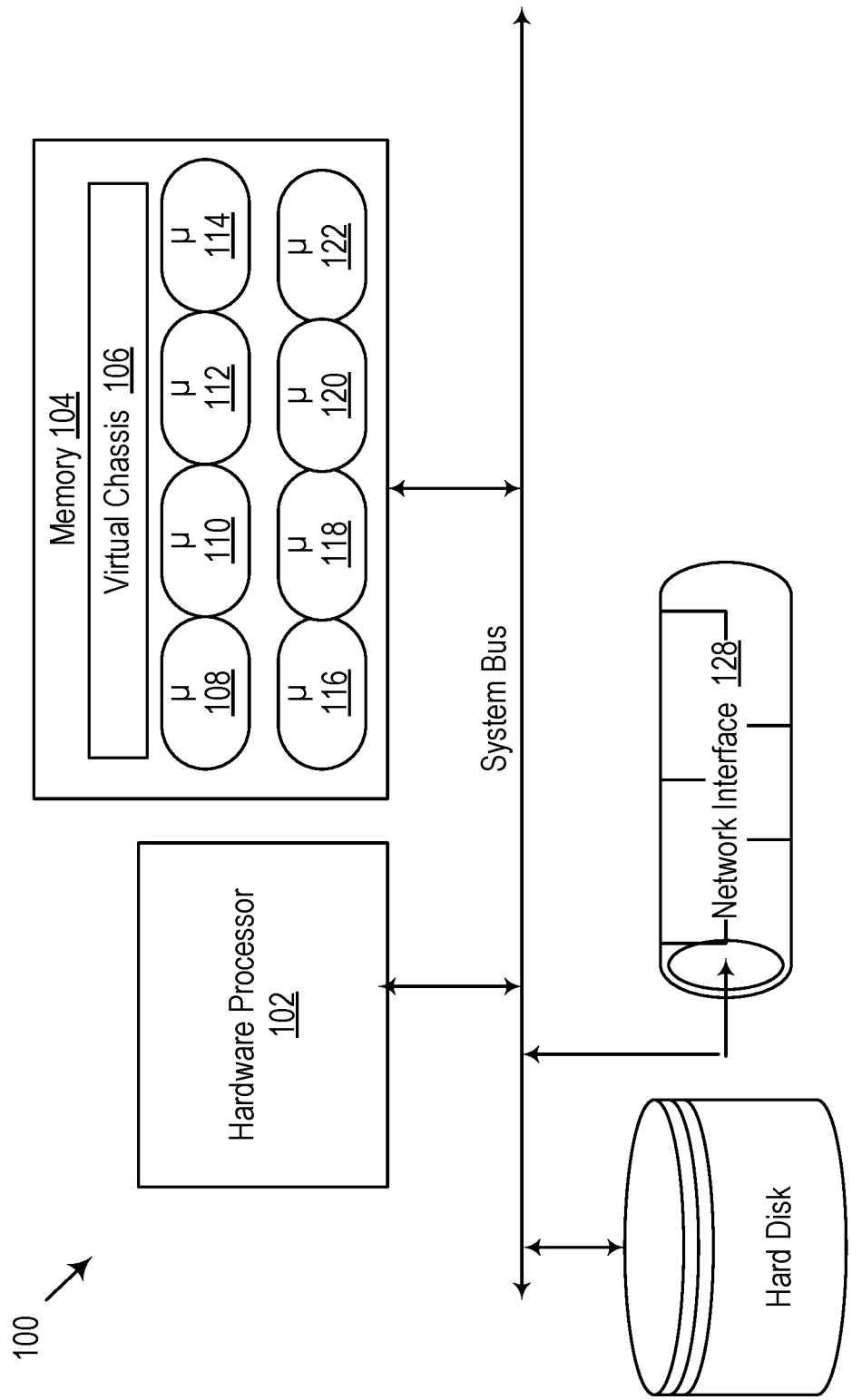
FIG. 1 is a block diagram illustrating computer hardware for loading network security system microservices from a memory and executing them by a processor in accordance with the disclosed embodiments.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form to avoid unnecessarily obscuring embodiments of the present invention.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments are described herein according to the following outline:
 1.0. General Overview
 2.0. Operating Environment
 2.1. System Overview
 2.2. Microservice for Intercepting Network Traffic
 3.0. Functional Overview
 4.0. Example Embodiments
 5.0. Implementation Mechanism—Hardware Overview
 6.0. Extensions and Alternatives

1.0. General Overview

Modern data centers and other computing environments can include anywhere from a few computer systems to thousands of systems configured to process data, service requests from remote clients and other applications, and perform numerous other computational tasks. The large number of interworking systems, applications, etc., make such computing environments susceptible to a wide variety of network security threats and other issues. A number of network security tools are available to protect such systems and the computer networks interconnecting these systems, and many of these tools comprise a monolithic set of network security functions. For example, a typical network security tool might comprise a hardware unit including firewall services, routing services, virtual private network (VPN) services, and so forth.

The type of network security tool described above is useful for providing a variety of network security functions as a single unit. However, efficiently scaling these types of network security tools is often challenging. For example, if a particular computer environment might benefit from increased firewall resources, a system administrator may install one or more additional hardware units each including firewall services in addition to a suite of other network security functions. While the addition of these new hardware units may meet the increased firewall resource needs, some of the hardware units may include unnecessary and/or underutilized resources devoted to virtual private network (VPN) services, data loss prevention (DLP) services, or other security services.

One way in which many modern computing environments scale resources more efficiently is using virtualized computing resources. A virtualized computing resource generally refers to an abstracted physical computing resource presented to an operating system and its applications by means of a hypervisor, such that the virtual computing resources (compute, memory, network connectivity, storage, etc.) are configurable and may be different from those of the physical computing resource. According to one embodiment, these types of virtualized infrastructures are used to efficiently scale network security applications based on the use of "microservices," where a microservice is a particular type of virtualized computing resource packaged as a software container. For example, a network security platform may comprise separate microservices providing firewall resources, DLP services, VPN services, etc. In general, the use of such microservices can provide greater flexibility because the microservices can be more easily deployed and scaled in response to variable demands for various types of network security services.

The type of efficient network security application scaling described above can be achieved with the use of a security application that is configured to scale network security services using microservices. Although many of the techniques described herein are explained with reference to a microservice-based network security application, the techniques are also applicable to other types of network security systems.

2.0. Operating Environment

2.1. System Overview

FIG. 1 is a block diagram illustrating an embodiment of a scalable microservice architecture using microservices. Network security system microservices 108-122 are stored in memory 104 (e.g., volatile memory such as Random Access Memory (RAM) and/or non-volatile memory such as disk) and executed by one or more hardware processors or processor cores 102. Network security system microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices stored in memory 104. A network interface 128 (e.g., fabric or interconnect that is wired or wireless) provides a means for communicating with a data center. Network security system 100 may inspect traffic, detect threats, and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which is also a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
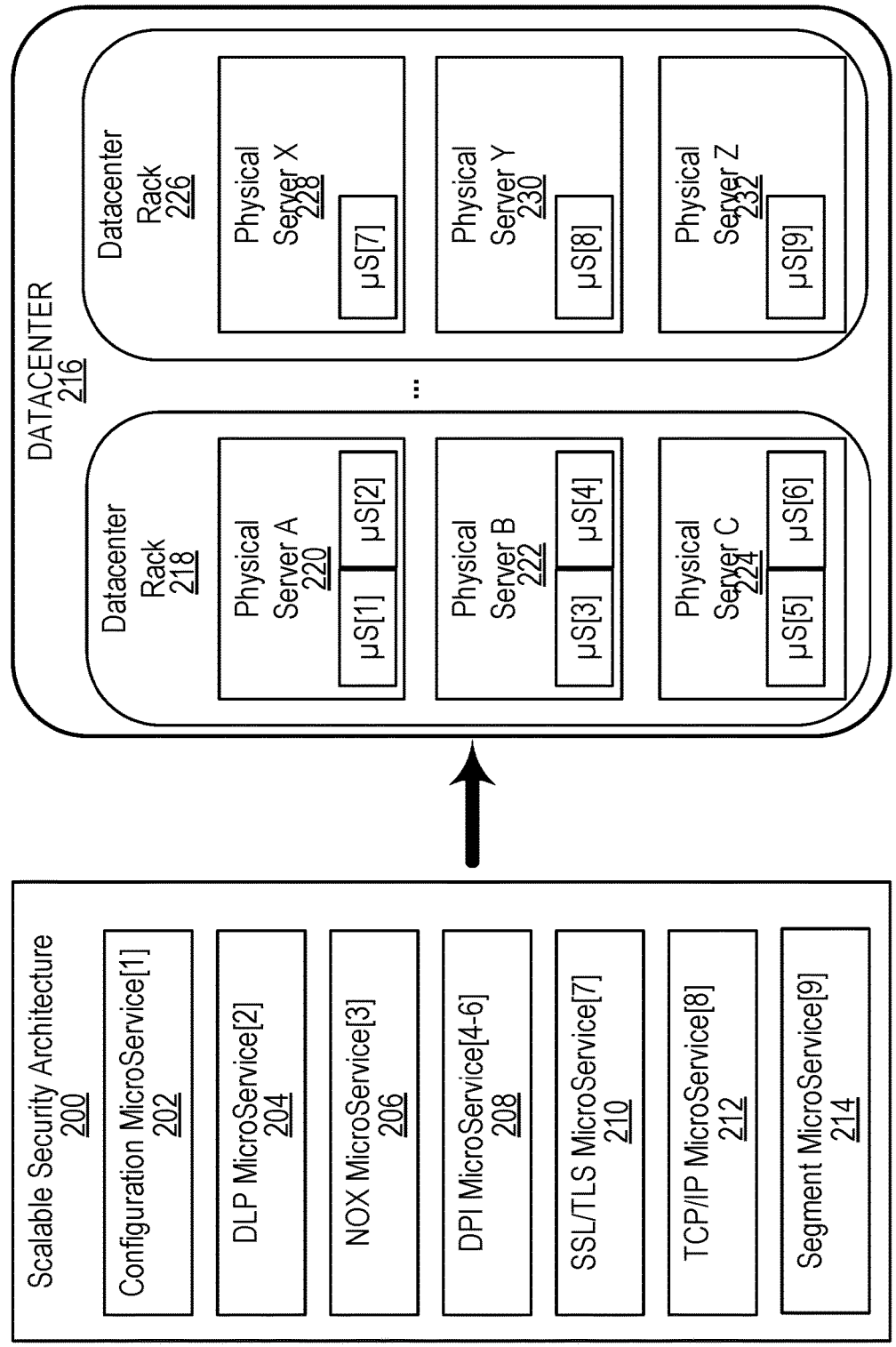
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
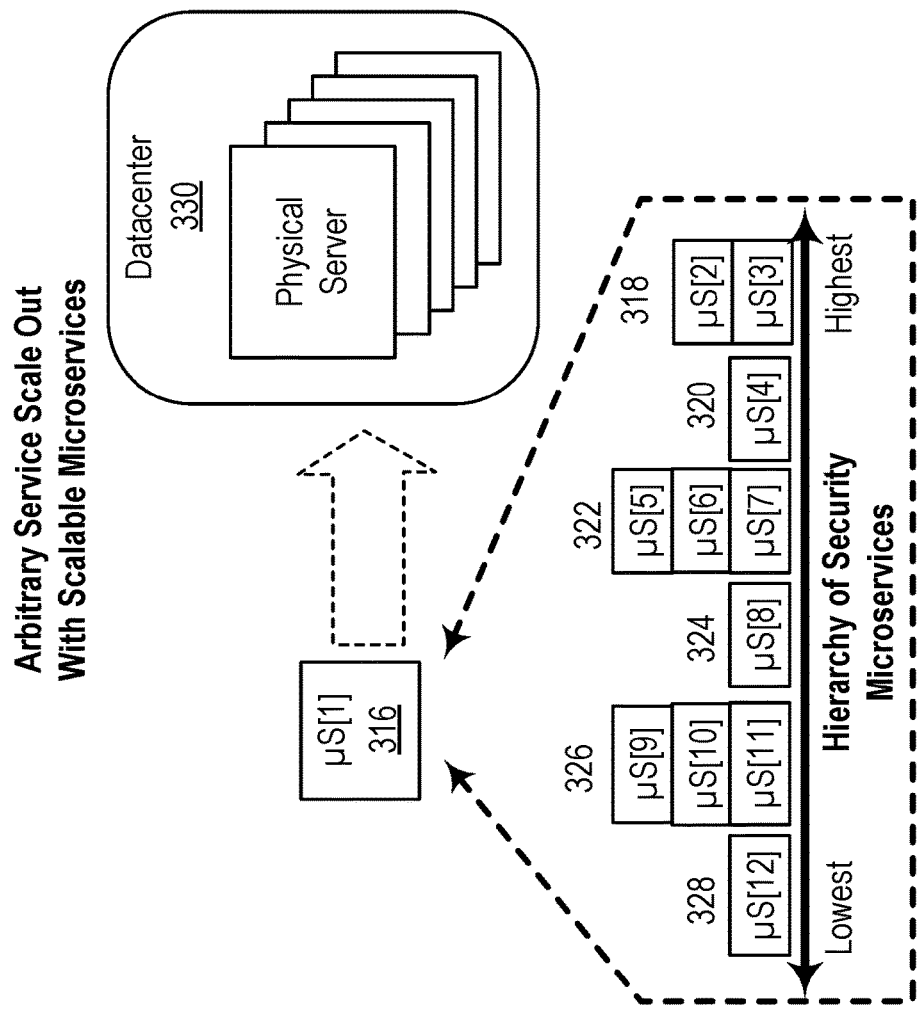
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
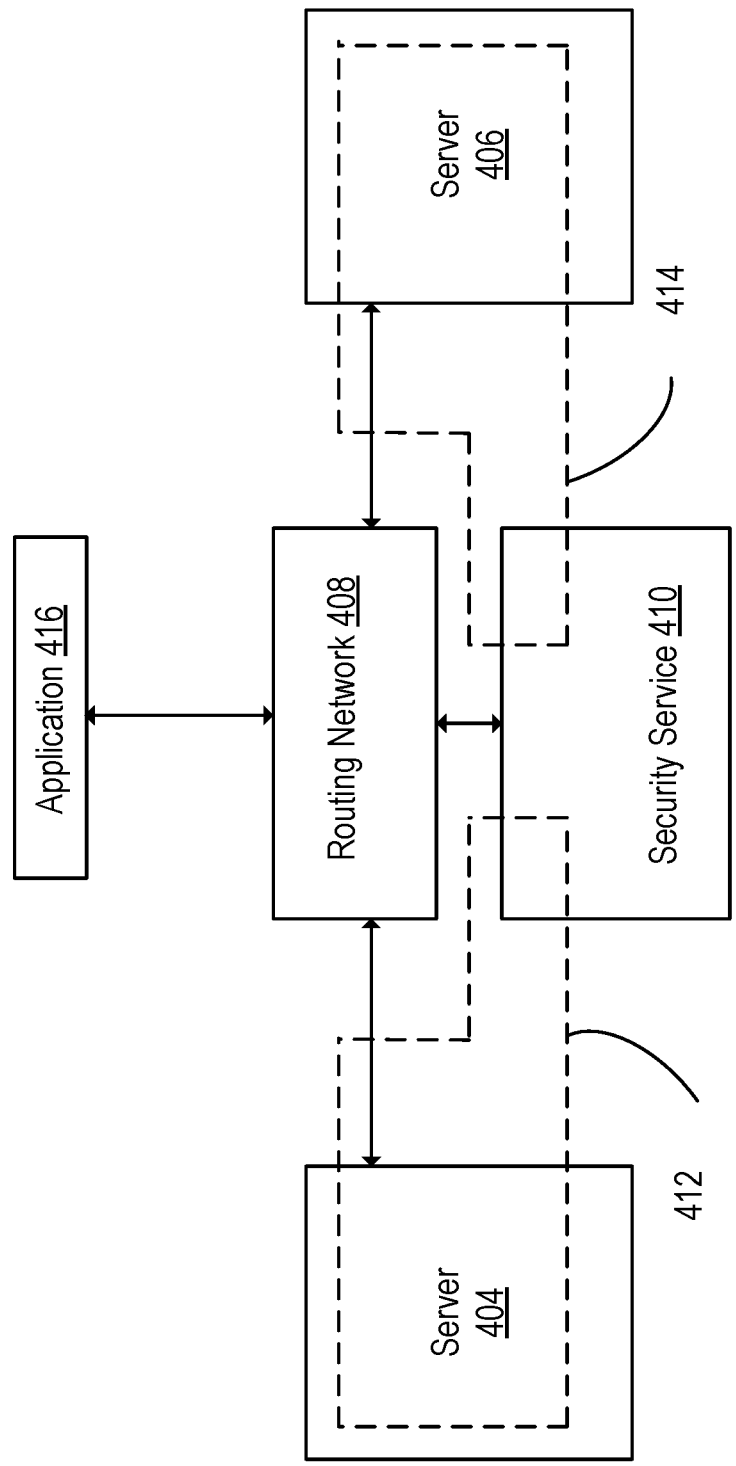
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 may not be confined to one physical server such as a server 404, 406. For example, one or more microservices of the security service 410 may be executed on server 404, and other microservices of the security service 410 may be executed on server 406. In some embodiments, the security service 410 is executed on a different server from one or more servers for which the security service is responsible for monitoring and protecting.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, by virtue of routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
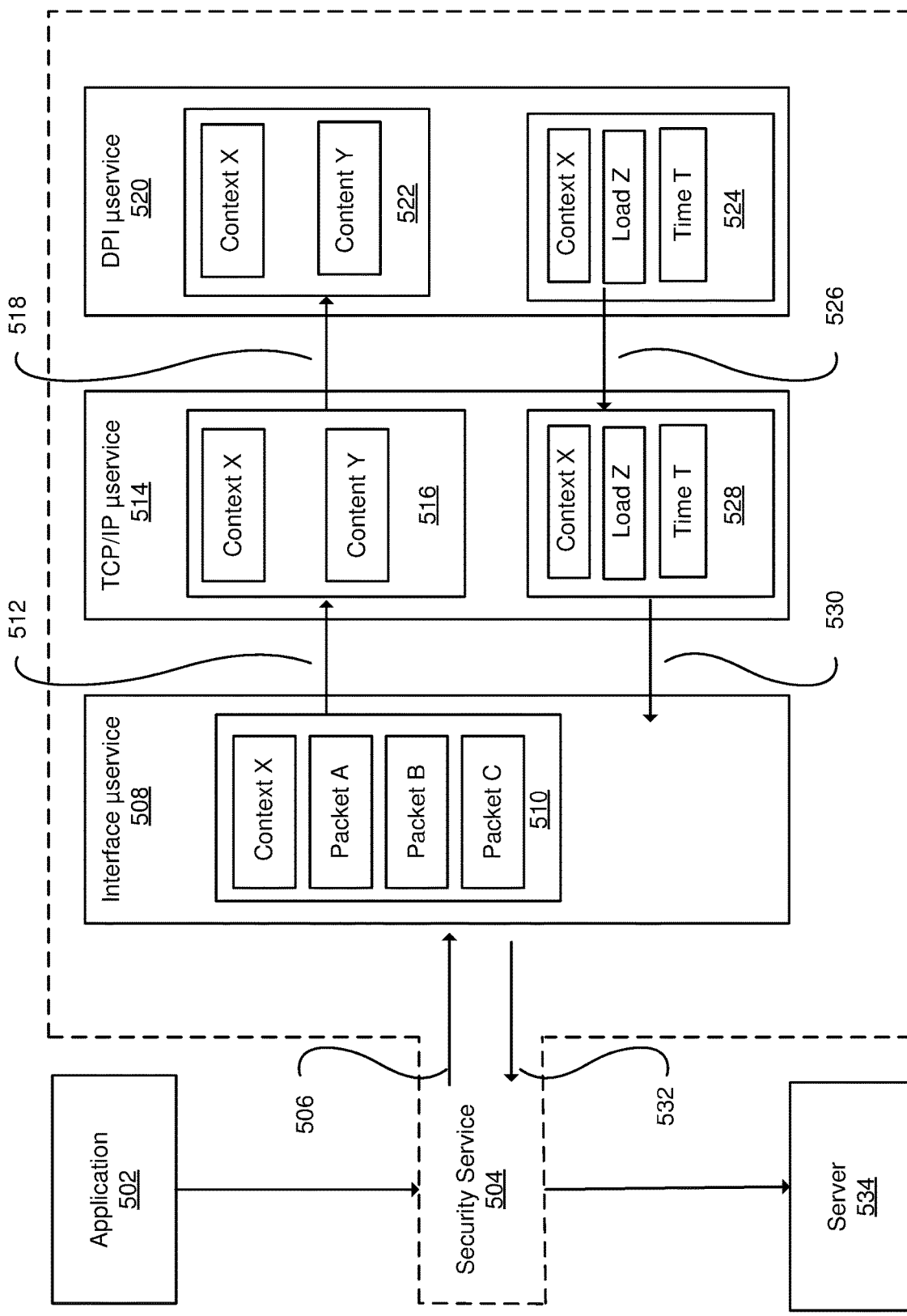
FIG. 5 is a block flow diagram illustrating application data traversing to a server after passing through a hierarchy of a security microservices in accordance with the disclosed embodiments.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as Internet Protocol (IP) addresses, ports, and MAC addresses for the source and/or destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
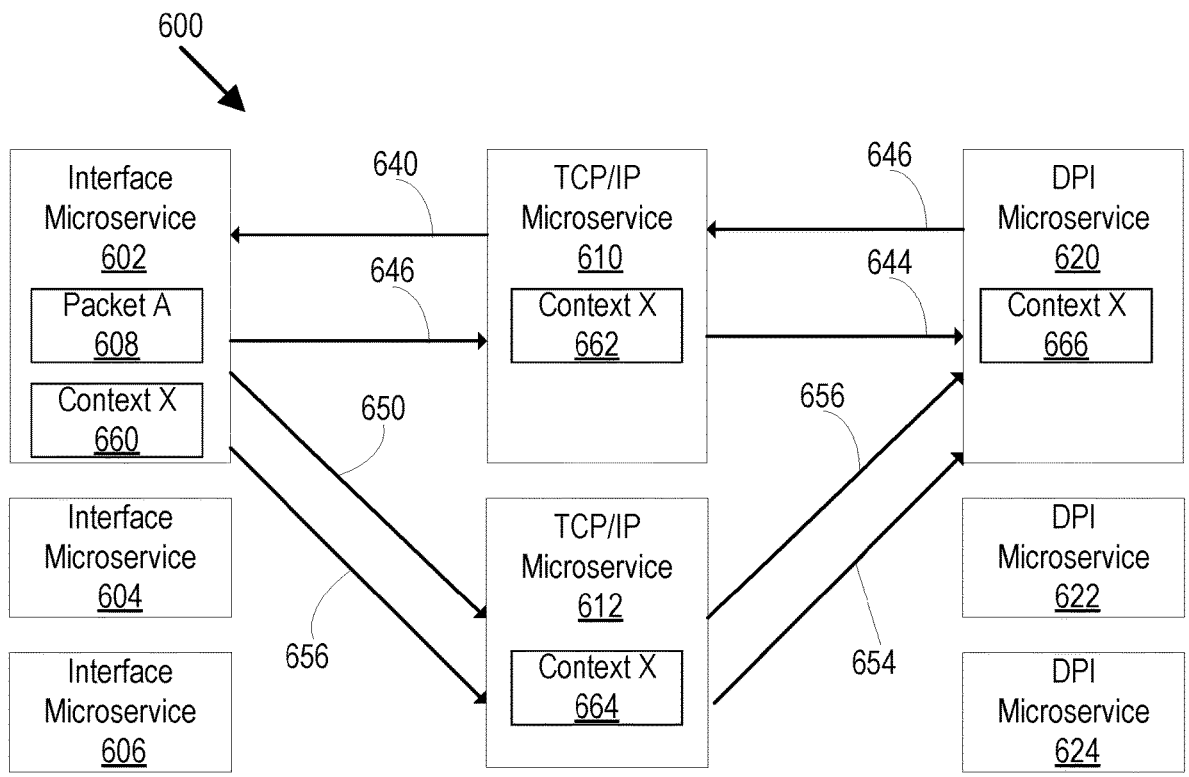
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices and/or a different number of microservice types. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data and/or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

2.2. Microservices for Intercepting Network Traffic

Figure 7:
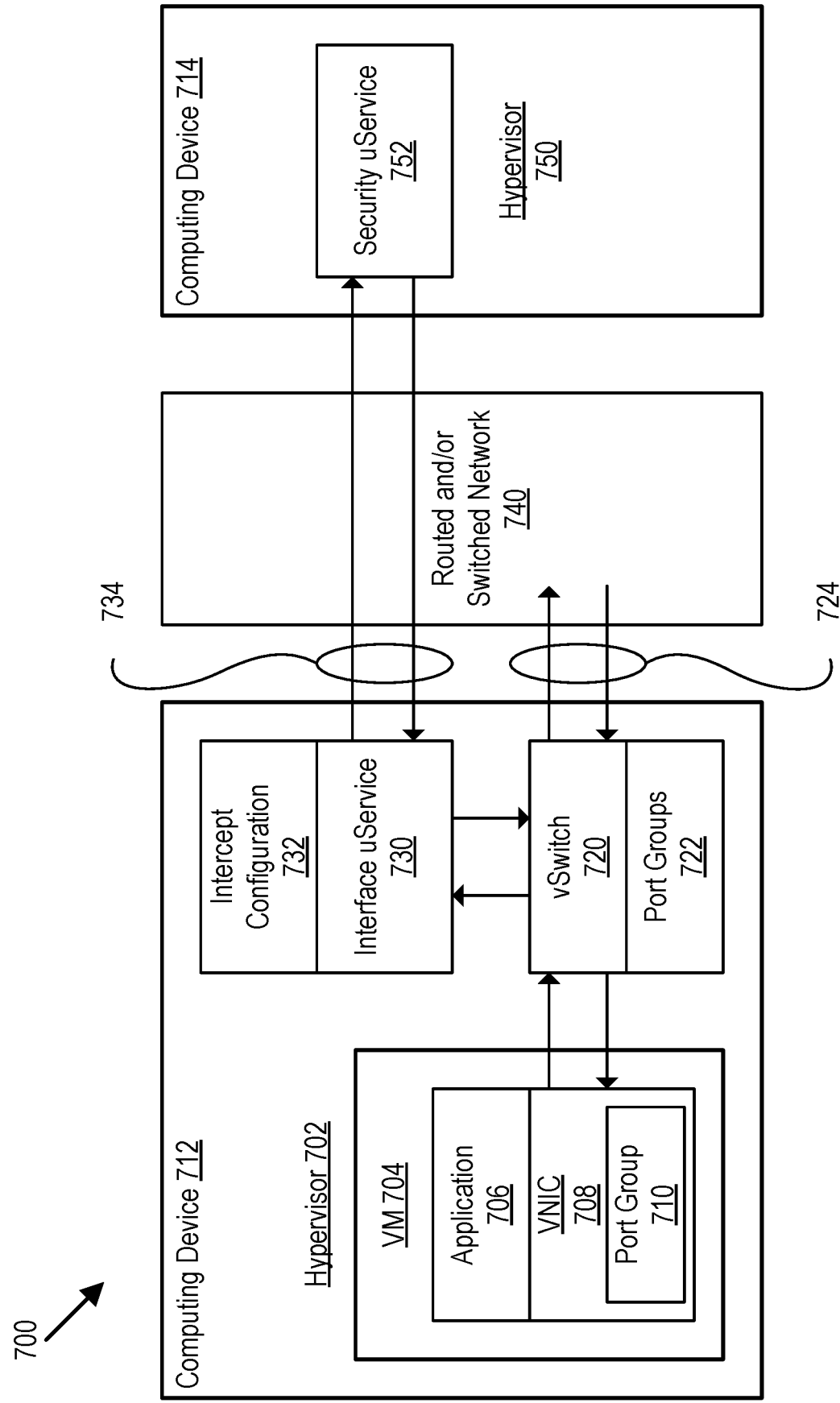
FIG. 7 is a block diagram illustrating an example computing device running at least one virtual machine (VM) coupled to a routed network via a virtual switch (vSwitch) in accordance with the disclosed embodiments.

FIG. 7 is a block diagram illustrating an example system for using an interface microservice to intercept network traffic routed by a virtual switch (vSwitch). In an embodiment, a system 700 includes at least one computing device 712 coupled to at least one other computing device 714 via a routed and/or switched network 740. The routed and/or switched network 740, for example, might be a network within a data center interconnecting various types of devices within the data center, or any other type of network connecting computing devices 712, 714. FIG. 7 represents an example embodiment that is provided for purposes of illustrating a clear example; other embodiments may use different arrangements.

In an embodiment, a computing device 712 includes a hypervisor 702, vSwitch 720, and an interface microservice 730. The hypervisor 702 is a component implemented in software, hardware, firmware, or combinations thereof, and which manages the creation and operation of one or more virtual machines (VMs) (e.g., a VM 704). Examples of a hypervisor 702 include, but are not limited to, a VMware® ESX™/ESXi™ hypervisor, a Citrix® XenServer® hypervisor, or a Microsoft® Hyper-V® hypervisor. In some embodiments, vSwitch 720 and port groups 722 are integrated into or otherwise part of hypervisor 702, configured via hypervisor 702, or some combination thereof.

In an embodiment, a VM 704 running on a hypervisor 702 is generally any type of emulated computer system that can share hardware resources with one or more other VMs running on the hypervisor 702. In the example of FIG. 7, a VM includes at least one application 706 and at least one virtual network interface card (VNIC) 708. Examples of an application 706 include, but are not limited to, an operating system, a system application, and a user application.

In an embodiment, a VM 704 is one of a plurality of VMs networked as part of a virtual network. The plurality of VMs can be networked in part using one or more vSwitches (e.g., vSwitch 720). Whereas a physical Ethernet switch manages network traffic between machines on a physical network, a vSwitch manages network traffic between VMs logically connected to virtual ports of the vSwitch. A vSwitch can be connected to other vSwitches and to one or more physical switches (not shown in FIG. 7) using physical Ethernet adapters to join virtual networks with physical networks. For example, the network path 724 might connect the vSwitch 720 to a routed and/or switched network 740 via one or more physical switches.

In an embodiment, a VNIC 708 of a VM 704 is connected to a port of the vSwitch 720, and the port can be assigned to a port group 710. At a high level, a port group is a vSwitch configuration which defines a logical grouping of VNICs connected to the ports comprising the group. For example, a system 700 might include any number of VMs 704 having any number of VNICs 708, and the VNICs can be grouped into any number of port groups by the vSwitch 720. A port group can be further associated with configuration options applied to the member ports including, for example, bandwidth limitations, traffic shaping rules, and other settings. In an embodiment, a vSwitch 720 stores configuration information related to port groups as port groups configuration 722. Based on the port groups configuration 722, for example, when a vSwitch 720 receives a packet from a VNIC of a VM, the vSwitch 720 can determine which port group the VNIC is associated with and tag the packet with a VLAN assigned to the port group in the configuration.

Figure 8:
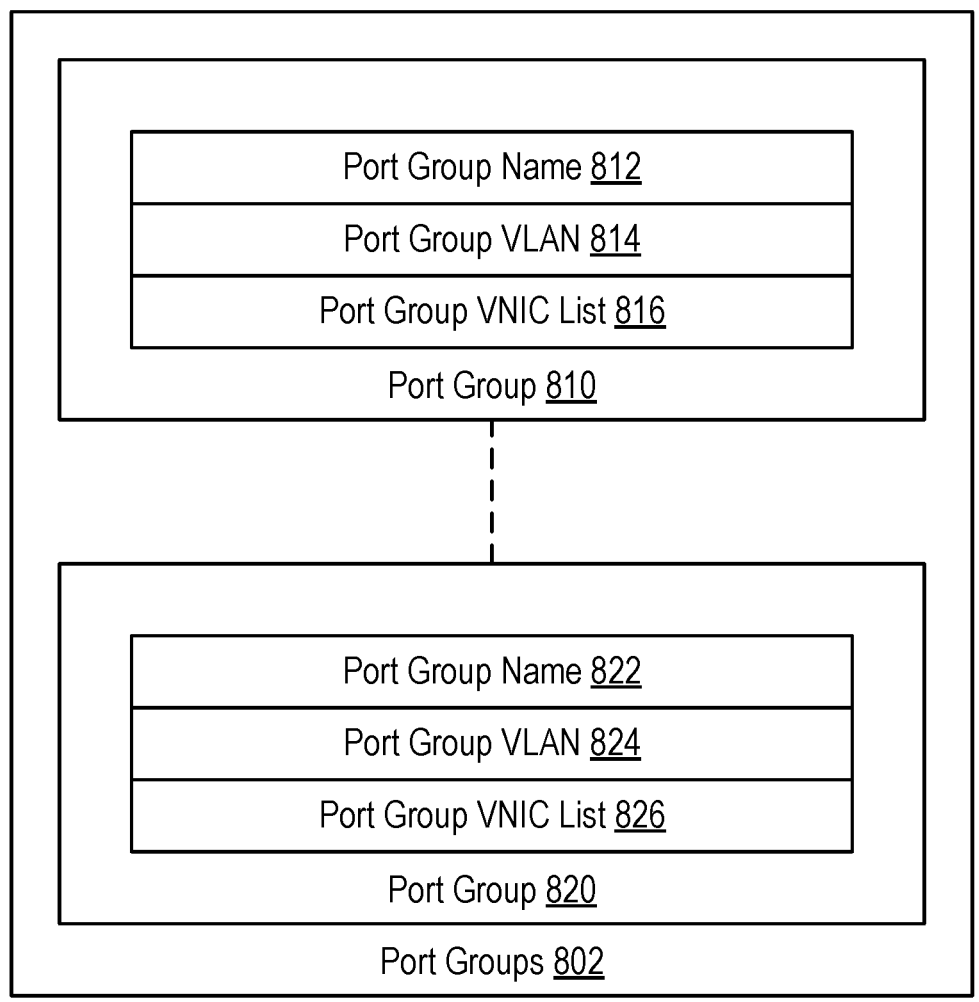
FIG. 8 is a block diagram illustrating example port group settings in accordance with the disclosed embodiments.

FIG. 8 is a block diagram illustrating an example set of port group definitions, as shown in FIG. 7. For example, the port groups configuration 802 shown in FIG. 8 includes the port group definitions 810, 820. In one embodiment, a port group definition includes a port group name (e.g., port group name 812, 822), a port group VLAN (e.g., port group VLAN 814, 824), and a port group VNIC list (e.g., port group VNIC lists 816, 826). A port group name is an optional label for the port group, the port group VLAN identifies a VLAN associated with the port group, and the port group VNIC list identifies a set of VNICs belonging to the port group. The example port group configuration as shown in FIG. QAH, for example, can be part of port groups configuration 722 stored at a vSwitch 720, as shown in FIG. 7.

As described in more detail herein, an interface microservice 730 enables network traffic sent to and received from a VM 704 (and any other VMs generating network traffic routed by vSwitch 720) to be intercepted and filtered based on an intercept configuration 732. As shown in FIG. 7, an interface microservice 730 can optionally send, via network path 734, intercepted network traffic to a security microservice 752 running on a separate computing device 714. The computing device 714, for example, includes a separate hypervisor 750 and may further include any number of VMs running on the hypervisor 750. In other examples, an interface microservice 730 can perform various security operations locally at the computing device 712 without sending the intercepted network traffic to a separate computing device 714.

In one embodiment, a microservice as depicted in FIG. 7 (e.g., interface microservice 730 or security microservice 752) is implemented using a software "container," where a container is an isolated user space instance within a virtualization environment in which the kernel of an operating system allows for the existence of multiple isolated user-space instances. In other examples, a microservice is implemented by a virtual machine instance, a thread of execution, a standalone software application, or any other type of computer-executable logic.

Figure 9:
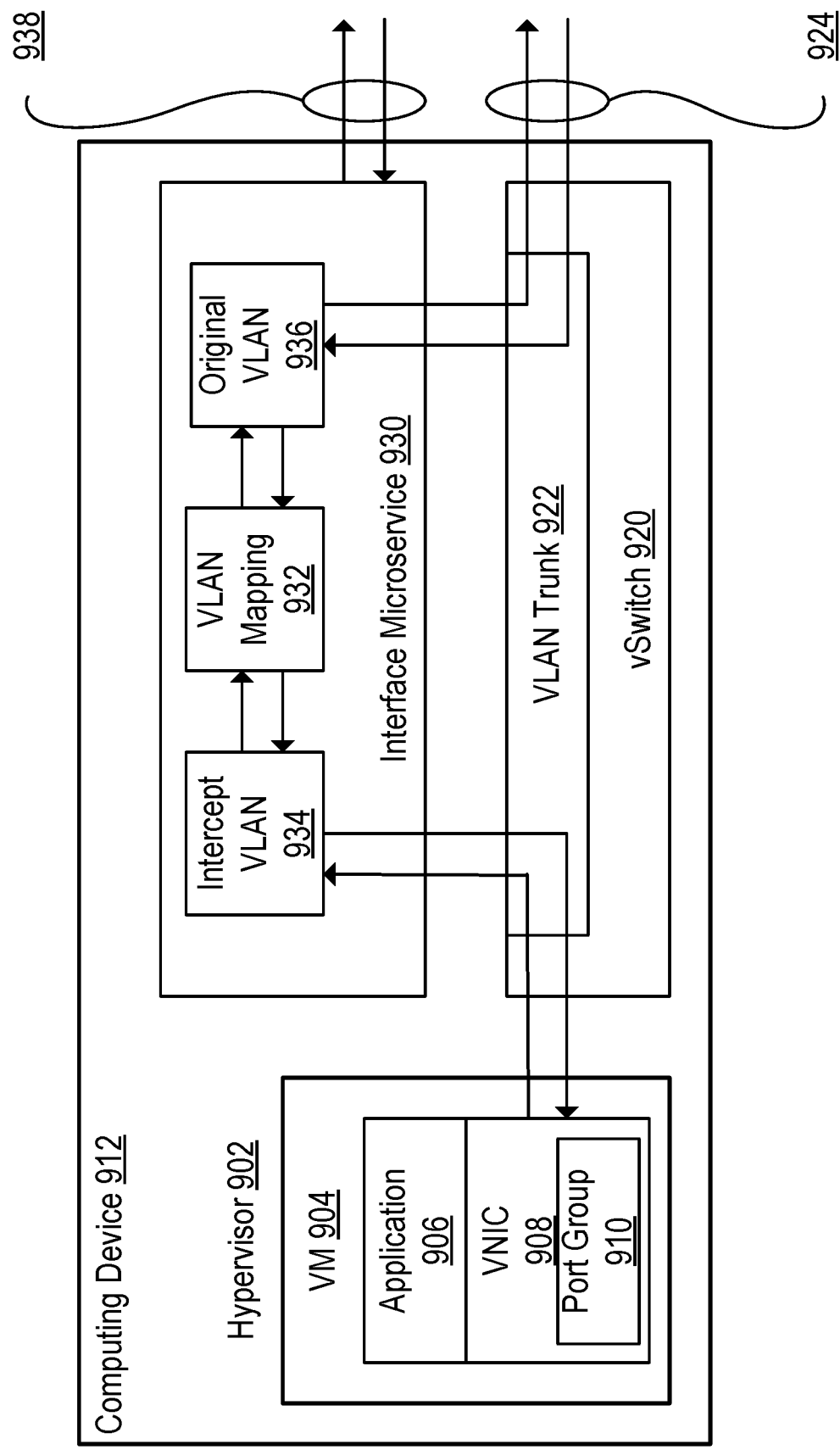
FIG. 9 is a block diagram illustrating an example computing device including an interface microservice configured to intercept network traffic routed through a vSwitch in accordance with the disclosed embodiments.

FIG. 9 is a block diagram illustrating an example interface microservice configured to intercept network traffic routed by a vSwitch in accordance with the disclosed embodiments. In FIG. 9, for example, an interface microservice 930 on a computing device 912 intercepts network traffic routed by a vSwitch 920 (e.g., network traffic sent and received by a VM 904 via VNIC 908). When the VNIC 908 sends a network packet (e.g., based on a request generated by an application 906 or other source), the VM 904 includes an identifier of the port group 910 with the network packet. If the interface microservice 930 was not present in FIG. 9, the network packets including the port group 910 identifier arrive at the vSwitch 920, the vSwitch 920 determines a VLAN to which the port group 910 is assigned, and sends the network packet out network path 924 based on the determined VLAN.

In an embodiment, a VLAN assigned to a port group 910 as in the example above is referred to as an "original" or "existing" VLAN. In one embodiment, to enable an interface microservice 930 to intercept network traffic routed by the vSwitch 920, the microservice creates a new VLAN, referred to herein as an "intercept" VLAN, for each original VLAN and further generates and stores a VLAN mapping 932 indicating a mapping from each original VLAN to a respective intercept VLAN. The interface microservice 930 further adds the original VLAN and the intercept VLAN to a VLAN trunk 922 enabling the traffic on both VLANs to be routed to an interface microservice 930.

In an embodiment, based on the configuration described above, the interface microservice 930 can change the VLAN assigned to port group 910 of VM 904 from the original VLAN to the intercept VLAN and, consequently, packets sent from VM 904 are directed to interface microservice 930 via the VLAN trunk 922. The interface microservice 930 can then translate the intercept VLAN 934 to the original VLAN 936 using the VLAN mapping 932, and network traffic leaving network path 924 can be associated with the original VLAN.

Similarly, when a network packet is received by the vSwitch 920 coming in from the network path 924, because the interface microservice 930 is now part of the VLAN trunk 922 for both the intercept VLAN and the original VLAN and the incoming network packets are associated with the original VLAN, the network packets are routed to the interface microservice 930. The interface microservice 930 similarly maps the original VLAN to the intercept VLAN using the mapping 932, and the packets are sent to the VM 904 using the VLAN trunk 922. In this manner, the changes to the network structure at the hypervisor 902 and vSwitch 920 are transparent to outside devices which only are aware of the original VLAN.

3.0. Functional Overview

Approaches, techniques, and mechanisms are disclosed that enable a computer security application to intercept, filter, and perform security operations on network traffic sent from and received by VMs in a networked computing environment. In one embodiment, a computer security application configures a vSwitch to enable traffic routed by the vSwitch to be intercepted and filtered by an interface microservice. The interface microservice receives, from the vSwitch, configuration information including a mapping between at least one port group identifier and at least one VLAN identifier. For each existing, or "original," VLAN identifier in the configuration information, the interface microservice creates a separate "intercept" VLAN. The interface microservice adds the at least one existing VLAN, the at least one intercept VLAN, and the interface microservice to a VLAN trunk. The configuration information is modified to replace the existing VLAN identifiers associated with the port groups with identifiers of the intercept VLANs.

In an embodiment, based on the configuration described above, an interface microservice can receive and filter traffic routed by a vSwitch and configured with the intercept VLANs. For example, a vSwitch receiving network packets associated with an intercept VLAN routes the packets to the interface microservice via the VLAN trunk created above. The interface microservice can retrieve and apply various packet filters stored in association with the intercept VLAN to the network packets. If the packet filters match any of the intercepted network packets, the interface microservice can perform various security operations on the packets, send the network packets for security processing by an external microservice, or perform any other operations. Otherwise, the microservice can send network packets not matching the retrieved packet filters to the intended destination based on an original VLAN identifier stored in an intercept to original VLAN mapping.

In an embodiment, an interface microservice is an executable component of a computer and network security system, such as the system described in Section 2.0. As illustrated in FIG. 7, for example, an interface microservice 730 configures a VM 704 and vSwitch 720 to route traffic through the interface microservice 730 to be filtered based on intercept configuration 732. In an embodiment, network traffic matching a filter can be processed locally, or sent to an external security microservice 752 for additional security operations. For example, a security microservice 752 can perform operations to determine whether network traffic matching the filter poses a potential security threat to computing device 712 or other devices.

3.1. Configuring a vSwitch for Traffic Interception

In an embodiment, security services provided to a VM 704 include intercepting and analyzing network traffic traversing a network path 724. At a high level, an interface microservice 730 works with a vSwitch 720 to provide security services by filtering intercepted network packets, and by locally processing filtered packets or sending the filtered packets to one or more higher level security services via network path 734. The higher level security services might reside on a different virtual machine on the same local physical machine, at another physical machine, or at any location accessible to an interface microservice 730.

Figure 10A:
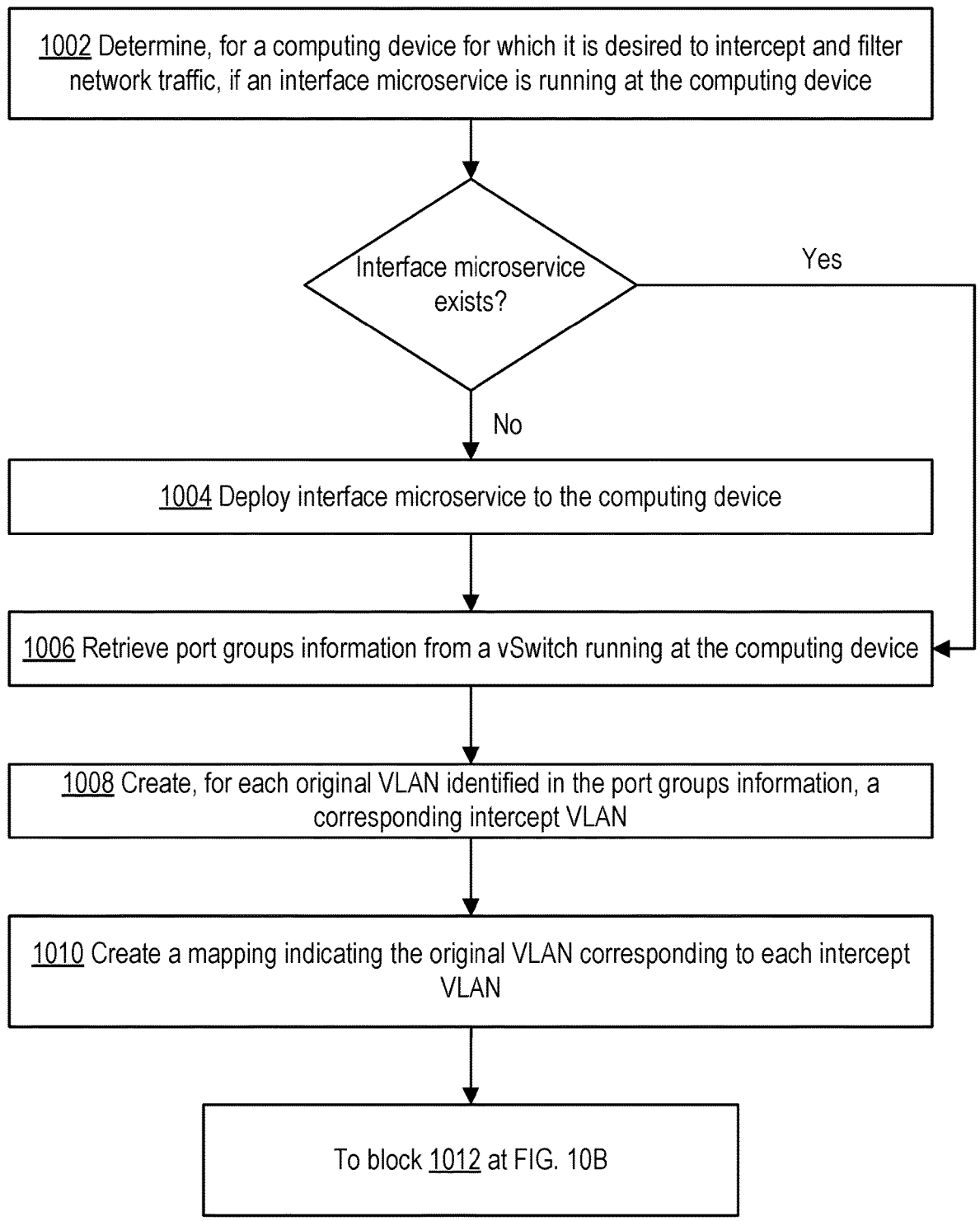
FIGS. 10A, 10B include a flow diagram illustrating an example method for configuring an interface microservice to intercept network traffic routed by a vSwitch in accordance with the disclosed embodiments.
Figure 10B:
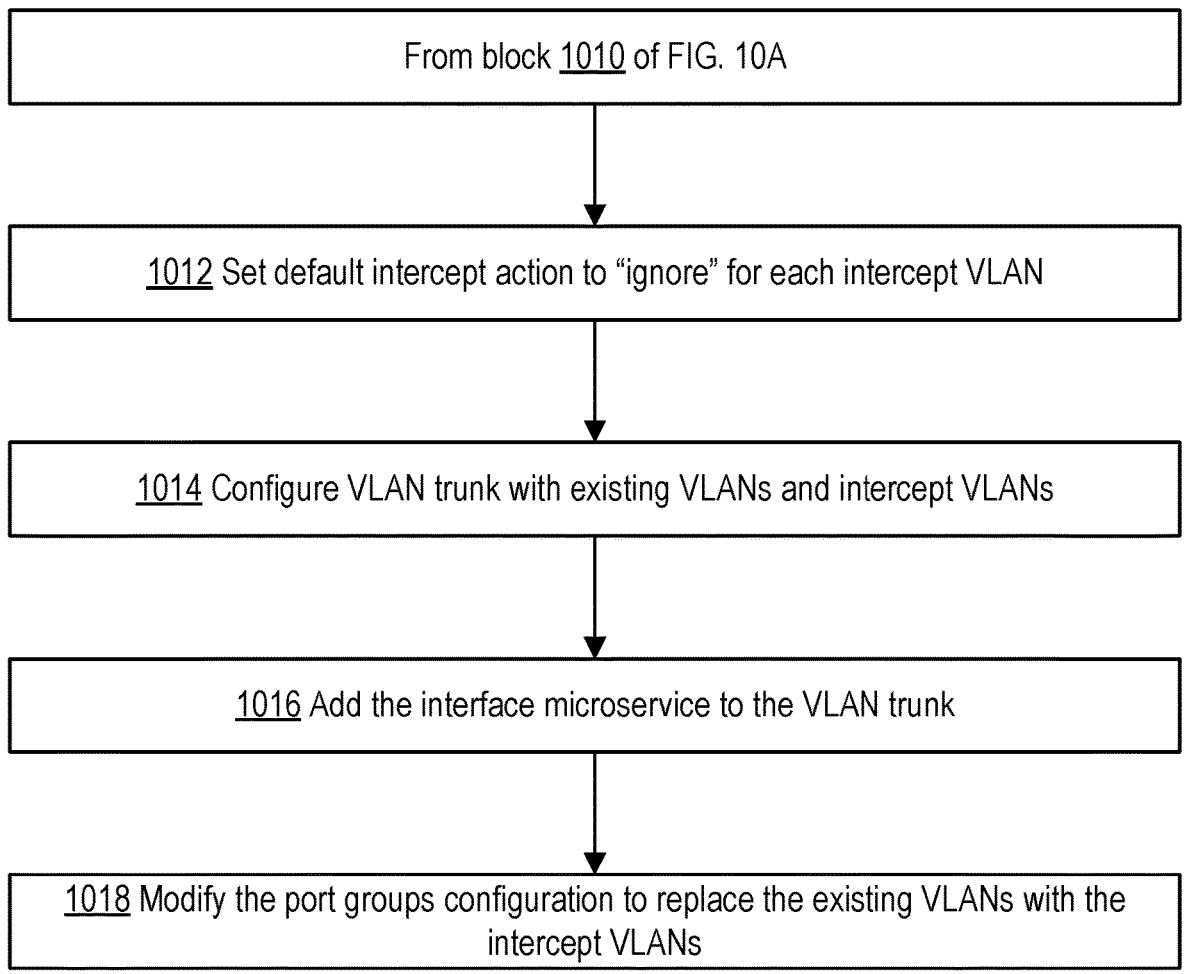

FIGS. 10A, 10B illustrate an example method of configuring a vSwitch to enable an interface microservice to intercept and filter network traffic routed by the vSwitch. At a high level, the method described in FIG. 10 inserts an interface microservice into a packet flow managed by a vSwitch in a way that is transparent to devices outside of the local area network(s) managed by the vSwitch. As described in more detail hereinafter, by enabling an interface microservice to transparently intercept network traffic at a vSwitch, the interface microservice can efficiently filter network traffic and determine whether to perform additional security operations on network traffic at the packet level. Although FIGS. 10A, 10B describes operations performed by a configuration microservice (e.g., a configuration microservice 202), some or all of the operations described in FIG. 10A, 10B can be performed by a configuration microservice, an interface microservice (e.g., an interface microservice 730), another type of microservice, an application, or any other computer-executable logic.

At block 1002, a configuration microservice determines, for a computing device for which it is desired to intercept and filter network traffic, if an interface microservice is running at the computing device. At block 1004, if an interface microservice is not currently running on the computing device, the configuration microservice installs an interface microservice (e.g., an interface microservice 730). Otherwise, if an interface microservice is currently running on the computing device, the method proceeds to block 1006.

In an embodiment, the computing device for which it is desired to intercept and filter network traffic includes at least one hypervisor, and at least one VM is running on the at least one hypervisor. As illustrated in FIG. 7, for example, a computing device 712 might include at least one hypervisor 702, where at least one VM 704 is running on the hypervisor. The at least one VM includes a VNIC 708 that is connected to a port of a vSwitch, which routes network traffic for a plurality of VNICs connected to the vSwitch.

In an embodiment, the vSwitch is associated configuration information which includes, for example, a port groups configuration 722. The port groups configuration 722 includes information defining one or more port groups managed by the vSwitch, where each port group is associated with a set of member VNICs. For example, one port group of port groups configuration 722 might include VNIC 708 and some number of other VNICs of the VM 704 or other VMs. The port groups configuration 722 includes a VLAN associated with each port group.

At block 1006, the interface microservice retrieves port groups information from the configuration for the vSwitch running on the computing device. As indicated above, the port groups configuration 722 indicates, for each port group, which VNICs (and associated VMs) are members of the port group and further identifies a mapping with an associated VLAN. In one embodiment, the set of VLANs associated with the port groups defined in a port groups configuration 722 of a vSwitch 720 is referred to herein as a set of existing, or original, VLANs.

At block 1008, the configuration microservice creates, for at least one original VLAN identified in the port groups information, a corresponding intercept VLAN. For example, for each original VLAN associated with a port group from port groups configuration 722 of vSwitch 720, a configuration microservice can create a corresponding intercept VLAN. In general, each of the intercept VLANs created at block 1008 represents an internal version of a corresponding original VLAN and can be used to route the original VLAN traffic to an interface microservice 730, as further described in the following operations.

At block 1010, the configuration microservice creates a mapping indicating the original VLAN corresponding to each intercept VLAN created at block 1008. In one embodiment, the mapping is stored by the interface microservice 730 (e.g., illustrated in FIG. 9 as VLAN mapping 932) such that an interface microservice 730 can translate network packets associated with an original VLAN into packets associated with an intercept VLAN, and vice versa. At block 1010, the process of FIG. 10A proceeds to block 1012 shown in FIG. 10B.

At block 1012, the configuration microservice optionally sets a default intercept action to "ignore" for each created intercept VLAN. For example, a configuration microservice might configure an interface microservice 730 initially to ignore network packets routed by a vSwitch 720 until further security processing is desired. In effect, setting an interface microservice's intercept action to "ignore" causes the interface microservice to operate in a "pass-through" mode, whereby packets received by the microservice are passed through the interface microservice without processing. In this example, an interface microservice 730 receives network packets associated with an intercept VLAN, translates the intercept VLAN to an original VLAN, and causes the network packets to be sent out a network path 724. In this manner, other networked devices receiving the network packets via network path 724 can be unaware of the intercept VLAN originally associated with the network packets.

At block 1014, the configuration microservice configures a VLAN trunk to include the original VLANs and the intercept VLANs. At a high level, a VLAN trunk is a network link used to carry traffic for multiple VLANs and to operate as a single logical link for multiple virtual links. In an embodiment, the VLAN trunk configured at block 1014 is able to carry traffic for both the original VLANs and the intercept VLANs created at block 1008. As described above, network traffic can be associated with a particular VLAN based on a VLAN tag included with the network packets (e.g., by a VM 904 originating a network packet, an interface microservice 930 intercepting a network packet, or another device).

At block 1016, the configuration microservice adds the interface microservice to the VLAN trunk. In an embodiment, adding the interface microservice to the VLAN trunk enables the interface microservice to receive network traffic associated with either the original or intercept VLANs (e.g., network traffic associated with an intercept VLAN by a VM 904 or network traffic arriving at network path 924 associated with an original VLAN).

At block 1018, the configuration microservice modifies the port groups configuration at the computing device to use the intercept VLAN. For example, a configuration microservice can modify the port group 910 at a VM 904 to use the intercept VLAN mapped to the original VLAN. Based on the modification to the port group 910 configuration, the VM 904 includes a VLAN tag of the intercept VLAN with network packets sent from the VM 904. As described in more detail in reference to FIG. 11, because the network packets are associated with the intercept VLAN, the vSwitch 920 routes the traffic to the interface microservice 930 via the VLAN trunk 922.

Figure 11:
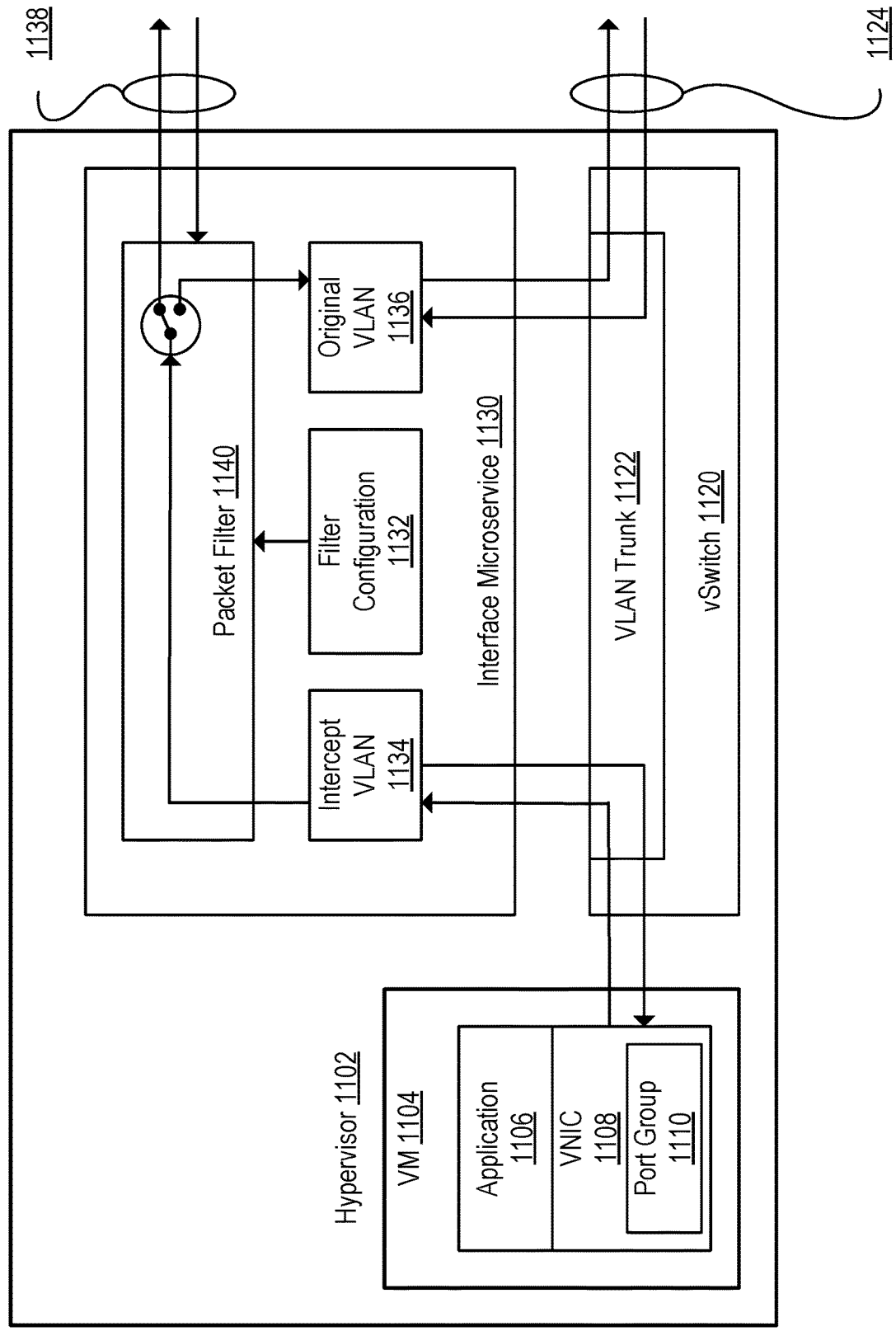
FIG. 11 is a block diagram illustrating an example computing device including an interface microservice configured to intercept and filter network traffic routed by a vSwitch in accordance with the disclosed embodiments.

FIG. 11 illustrates an example system with an interface microservice configured using the method described in FIG. 10. In an embodiment, a configured interface microservice 1130 includes an interface for network traffic associated with an intercept VLAN 1134, an interface for network traffic associated with original VLAN 1136, a packet filter 1140, and a filter configuration 1132. In an embodiment, a filter configuration 1132 enables the interface microservice 1130 to filter packets coming from VM 1104 (and any other VMs connected to the vSwitch 1120) using the packet filter 1140. If the packet filter 1140 does not match an examined network packet, the interface microservice 1130 applies the original VLAN 1136 mapping to the network packet and sends the packet out network path 1124.

If the packet filter 1140 does match an examined network packet, the interface microservice 1130 can perform any operations relative to the network packet, including sending the network packet to another microservice on the same machine, sending the network packet to a security service running on another machine via network path 1138. In the example of FIG. 11, if a network packet is sent to a security service running on a separate machine, and if the security service allows the packet (e.g., because the packet did not raise any security concerns), the packet returns via network path 1138. The interface microservice 1130 can then apply the original VLAN 1136 to the network packet and send the packet out network path 1124. At a high level, a packet filter 1140 enables an interface microservice 1130 to quickly determine whether individual network packets warrant additional security processing (e.g., based on ports or IP addresses of interest, a size of the packets, etc.) before sending the network packets out to other devices. The configuration of FIG. 11 thus enables packet-level granularity for determining whether to apply additional security processing to packets arriving at the vSwitch 1120.

For example, assume a network administrator desires to check for "poisoned" SQL queries. In this example, the security administrator may configure an interface microservice 1130 to filter network traffic associated with a connection to known SQL server address, or associated with web traffic containing a SQL query, and to send the filtered network traffic to another security microservice via network path 1138. The external security process, for example, may then reassemble the network traffic, run various security checks, or perform any other processing to determine whether or not the network packets potentially carry a SQL injection attack. If the external security service determines that the network traffic is safe, the interface microservice 1130 allows the network packets to be sent out the network path 1124 to the originally intended destination. Otherwise, network packets which the packet filter 1140 determines are not related to SQL queries can bypass the additional security processing to avoid using additional computational resources at the external security service.

Figure 12:
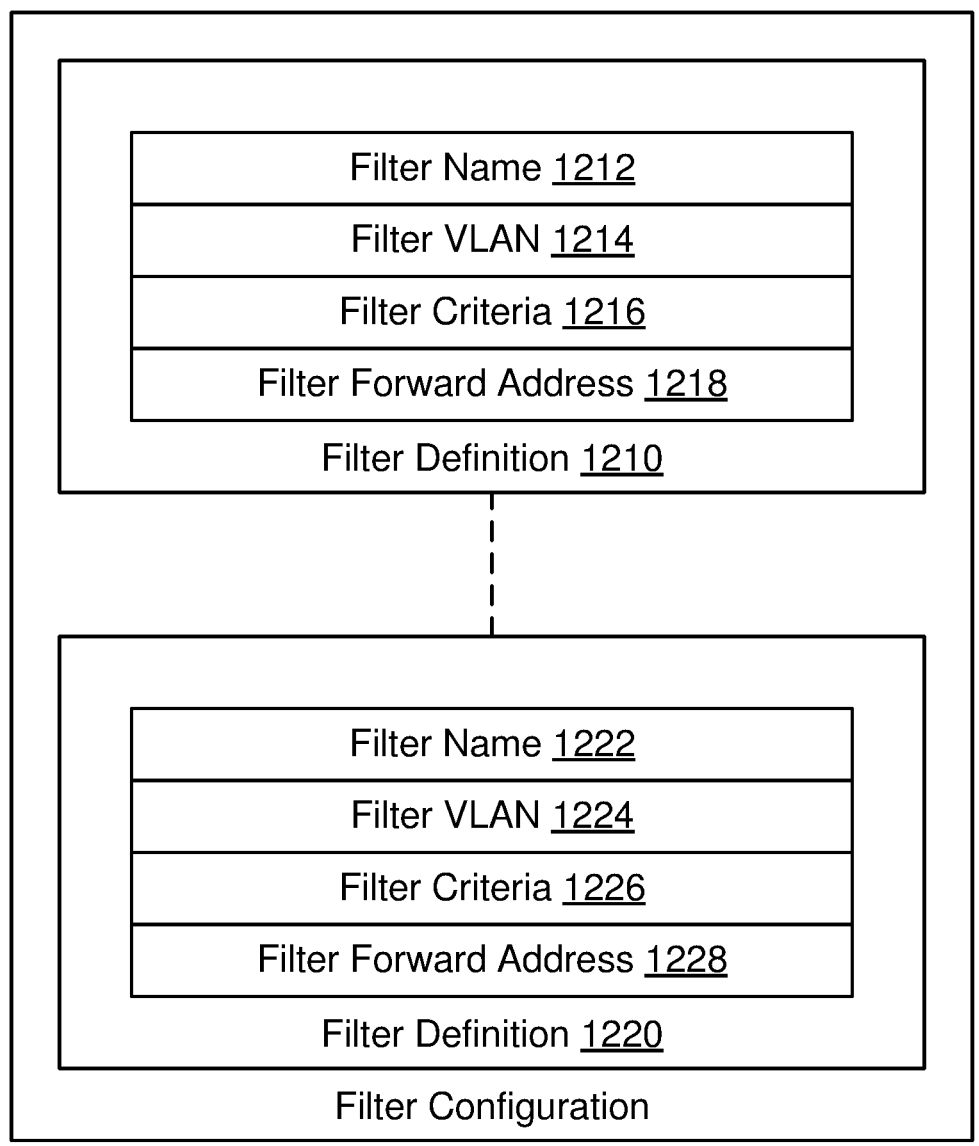
FIG. 12 is a block diagram illustrating example filter definitions in accordance with the disclosed embodiments.

FIG. 12 is a block diagram illustrating an example of a filter configuration (e.g., a filter configuration 1132 shown in FIG. 11). In general, a filter configuration 1132 can be used by an interface microservice 1130 to determine whether individual packets are subjected to additional security processing by the interface microservice 1130 or other microservices, as described above. In an embodiment, a filter definition (e.g., filter definition 1210, 1220) includes a filter name (e.g., filter name 1212, 1222), a filter VLAN (e.g., a filter VLAN 1214, 1224), filter criteria (e.g., filter criteria 1216, 1226), and a filter forward address (e.g., a filter forward address 1218, 1228).

In an embodiment, a filter name is a human-readable label for the filter (e.g., "SQL injection filter" or "DoS filter"). The filter VLAN indicates one or more VLANs to which the filter applies. For example, an interface microservice might perform packet filtering on network packets originating from multiple different VLANs, so filters can apply to particular VLANs. In some embodiments, a filter name is hierarchical such that a single human-readable label causes multiple functional filters to be employed concurrently. In some embodiments, a filter has dependencies on another filter, such that enabling a first filter causes at least one additional filter to be enabled concurrently.

In an embodiment, filter criteria include any rules, patterns, or other information used to determine whether a packet matches a filter. For example, filter criteria might include port numbers, IP addresses or IP address ranges, packet size thresholds or any other characteristic against which packets received by the microservice can be compared. In an embodiment, a forward address is a network address to which network packets are sent if the network packets match the packet filter. For example, the forward address might be an address of an external computing device which includes additional security services to be applied to packets matching the filter. As another example, a filter forward address might be a null value indicating that the filter can simply send network packets matching the filter out a default interface.

Figure 13:
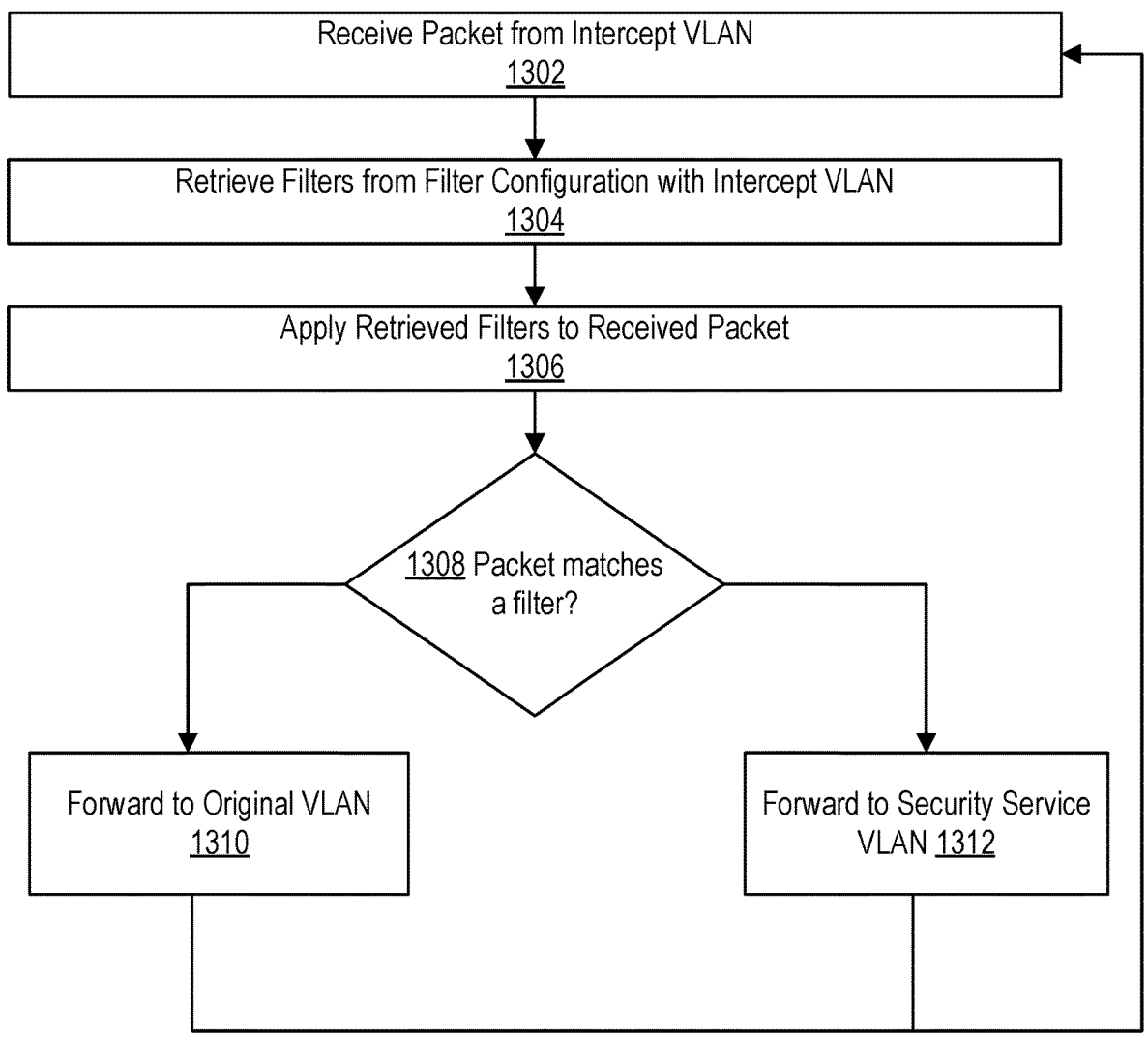
FIG. 13 is a flow diagram illustrating an example method used to filter network traffic routed by a vSwitch and intercepted by an interface microservice in accordance with the disclosed embodiments.

FIG. 13 illustrates an example method performed by an interface microservice to intercept and filter VLAN traffic. For example, in one embodiment, the method described in FIG. 13 can be performed by an interface microservice 1130 configured to intercept and filter network traffic based on the configuration described in reference to FIG. 10.

At block 1302, an interface microservice receives a packet from an intercept VLAN. For example, referring again to FIG. 11, an interface microservice 1130 might receive a packet from an intercept VLAN 1134, where the packet originates from a VM 1104 including a VNIC 1108, which is a member of the intercept VLAN 1134. The VM 1104 tags the packets sent from the VNIC 1108 with the VLAN based on the port group 1110 associated with the VNIC 1108.

At block 1304, the interface microservice identifies packet filters from a stored packet filter configuration that match the intercept VLAN. For example, an interface microservice 1130 receiving a packet tagged with an intercept VLAN can use the intercept VLAN identifier to locate packet filters associated with the intercept VLAN.

At block 1306, the interface microservice applies the identified packet filters to the received packet. In an embodiment, a packet filter applied to a packet either matches the packet or does not match the packet based on one or more criteria specified in the filter.

At block 1308, the interface microservice determines whether the packet matches the filter. If the network packet does not match the filter then, at block 1310, the interface microservice forwards the network packet to the original VLAN. If the network packet does match the filter then, at block 1312, the interface microservice forwards the packet to the address identified in the corresponding filter definition. As described above, the packet can be forwarded to another microservice on the same machine, to another machine, or any other location which can perform additional security operations on the packet to determine whether the packet is associated with any security threats.

4.0. Example Embodiments

Examples of some embodiments are represented, without limitation, by the following:

In an embodiment, a method or non-transitory computer readable medium comprises: retrieving, from a virtual switch (vSwitch) running in a computing environment, configuration information including a mapping between at least one port group identifier and at least one existing virtual local area network (VLAN) identifier; for an existing VLAN identifier from the configuration information, creating a separate intercept VLAN associated with an intercept VLAN identifier; adding the existing VLAN identifier, the intercept VLAN identifier, and an interface microservice to a VLAN trunk; modifying the configuration information to replace the existing VLAN identifier with the intercept VLAN identifier; receiving, from the vSwitch and as part of the VLAN trunk, a network packet from a virtual machine (VM) associated with the intercept VLAN; and determining whether the network packet matches a packet filter.

In an embodiment, a method or non-transitory computer readable medium comprises: wherein the computing environment includes a hypervisor, and wherein the VM is running on the hypervisor.

In an embodiment, a method or non-transitory computer readable medium further comprises: wherein the packet filter is one of a plurality of packet filters, and wherein the packet filter is associated with the intercept VLAN; and identifying the packet filter from the plurality of packet filters based on the association of the network packet with the same intercept VLAN.

In an embodiment, a method or non-transitory computer readable medium further comprises modifying the VM to use the intercept VLAN for network traffic associated with the VM.

In an embodiment, a method or non-transitory computer readable medium comprises: wherein the packet filter includes at least one filter criteria and a filter forward address.

In an embodiment, a method or non-transitory computer readable medium comprises: wherein the packet filter includes at least one filter criteria and a filter forward address, and wherein the filter forward address identifies a network location including a security microservice.

In an embodiment, a method or non-transitory computer readable medium comprises: wherein the packet filter includes at least one filter criteria and a filter forward address, and wherein the filter forward address indicates a network location to which to forward network packets matching the packet filter.

In an embodiment, a method or non-transitory computer readable medium comprises: further comprising, in response to determining that the network packet matches the packet filter, sending the network packet to a security microservice which performs one or more security operations on the network packet.

In an embodiment, a method or non-transitory computer readable medium comprises: further comprising, in response to determining that the network packet does not match the packet filter, modifying the network packet based on the existing VLAN identifier and forwarding the network packet to the existing VLAN.

In an embodiment, a method or non-transitory computer readable medium comprises: wherein determining whether the network packet matches the packet filter includes determining one or more of: whether the network packet is associated with a defined port, whether the network packet is associated with a defined IP address, whether the network packet exceeds a threshold packet size, whether the network packet exceeds a threshold packet length, and whether the network packet contains a defined type of content.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 14:
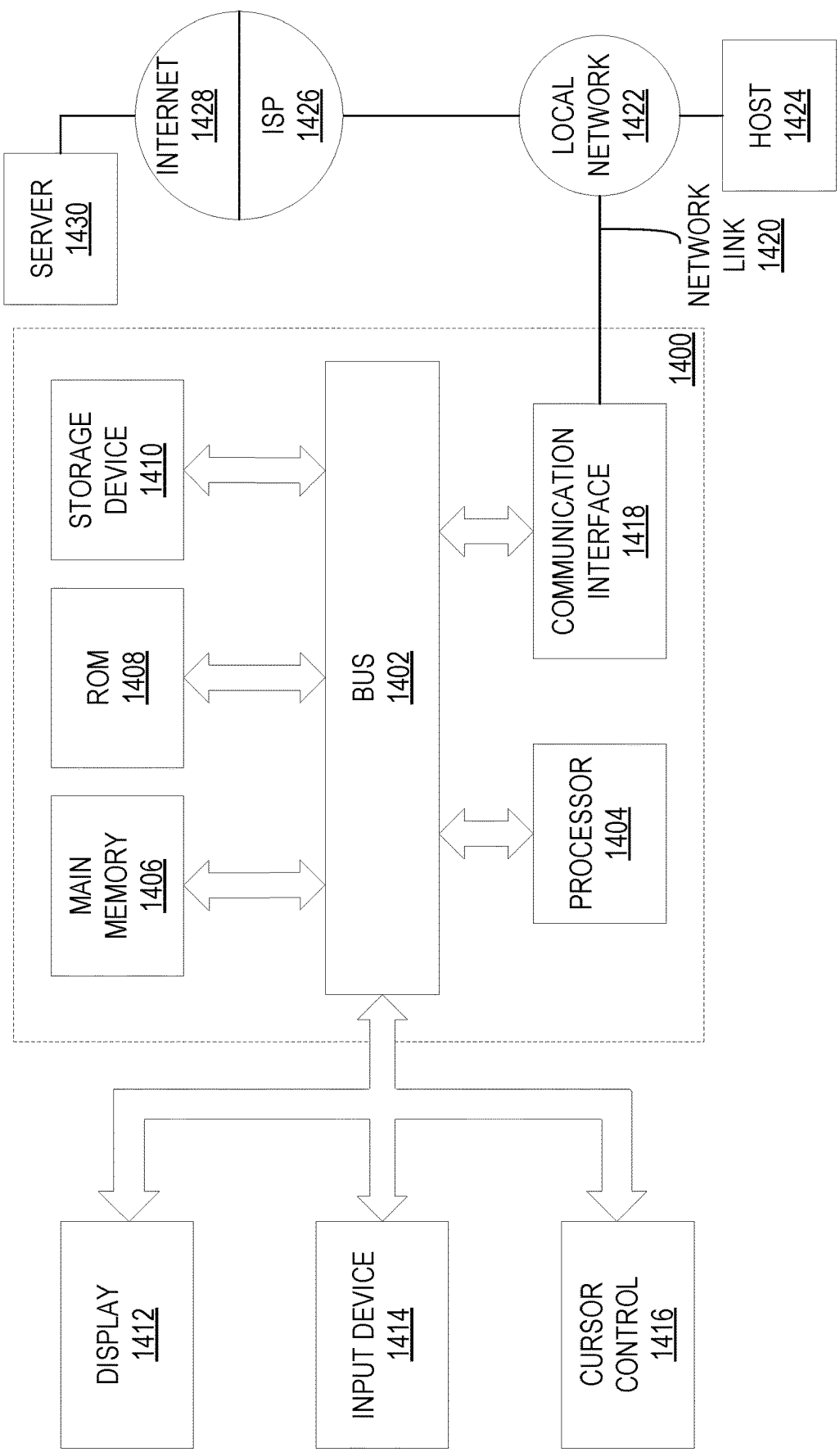
FIG. 14 illustrates a computer system upon which an embodiment may be implemented.

FIG. 14 is a block diagram that illustrates a computer system 1400 utilized in implementing the above-described techniques, according to an embodiment. Computer system 1400 may be, for example, a desktop computing device, laptop computing device, tablet, smartphone, server appliance, computing mainframe, multimedia device, handheld device, networking apparatus, or any other suitable device.

Computer system 1400 includes one or more buses 1402 or other communication mechanism for communicating information, and one or more hardware processors 1404 coupled with buses 1402 for processing information. Hardware processors 1404 may be, for example, general purpose microprocessors. Buses 1402 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1400 also includes a main memory 1406, such as a random access memory (RAM) or other dynamic or volatile storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 a special-purpose machine that is customized to perform the operations specified in the instructions.

Computer system 1400 further includes one or more read only memories (ROM) 1408 or other static storage devices coupled to bus 1402 for storing static information and instructions for processor 1404. One or more storage devices 1410, such as a solid-state drive (SSD), magnetic disk, optical disk, or other suitable non-volatile storage device, is provided and coupled to bus 1402 for storing information and instructions.

Computer system 1400 may be coupled via bus 1402 to one or more displays 1412 for presenting information to a computer user. For instance, computer system 1400 may be connected via an High-Definition Multimedia Interface (HDMI) cable or other suitable cabling to a Liquid Crystal Display (LCD) monitor, and/or via a wireless connection such as peer-to-peer WI-FI® Direct connection to a Light-Emitting Diode (LED) television. Other examples of suitable types of displays 1412 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1412.

One or more input devices 1414 are coupled to bus 1402 for communicating information and command selections to processor 1404. One example of an input device 1414 is a keyboard, including alphanumeric and other keys. Another type of user input device 1414 is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. Yet other examples of suitable input devices 1414 include a touch-screen panel affixed to a display 1412, cameras, microphones, accelerometers, motion detectors, and/or other sensors. In an embodiment, a network-based input device 1414 may be utilized. In such an embodiment, user input and/or other information or commands may be relayed via routers and/or switches on a Local Area Network (LAN) or other suitable shared network, or via a peer-to-peer network, from the input device 1414 to a network link 1420 on the computer system 1400.

A computer system 1400 may implement techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1400 can receive the data on the network and demodulate the signal to decode the transmitted instructions. Appropriate circuitry can then place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

A computer system 1400 may also include, in an embodiment, one or more communication interfaces 1418 coupled to bus 1402. A communication interface 1418 provides a data communication coupling, typically two-way, to a network link 1420 that is connected to a local network 1422. For example, a communication interface 1418 may be an integrated services digital network (ISDN) card, cable modem, satellite modem, or a modem to provide a data communication connection to a corresponding type of telephone line. As another example, the one or more communication interfaces 1418 may include a local area network (LAN) card to provide a data communication connection to a compatible LAN. As yet another example, the one or more communication interfaces 1418 may include a wireless network interface controller, such as a 802.11-based controller, BLUETOOTH® controller, Long Term Evolution (LTE) modem, and/or other types of wireless interfaces. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by a Service Provider 1426. Service Provider 1426, which may for example be an Internet Service Provider (ISP), in turn provides data communication services through a wide area network, such as the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

In an embodiment, computer system 1400 can send messages and receive data, including program code and/or other types of instructions, through the network(s), network link 1420, and communication interface 1418. In the Internet example, a server X30 might transmit a requested code for an application program through Internet 1428, ISP 1426, local network 1422 and communication interface 1418. The received code may be executed by processor 1404 as it is received, and/or stored in storage device 1410, or other non-volatile storage for later execution. As another example, information received via a network link 1420 may be interpreted and/or processed by a software component of the computer system 1400, such as a web browser, application, or server, which in turn issues instructions based thereon to a processor 1404, possibly via an operating system and/or other intermediate layers of software components.

In an embodiment, some or all of the systems described herein may be or comprise server computer systems, including one or more computer systems 1400 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   retrieving, from a virtual switch (vSwitch) corresponding to a hypervisor running in a computing environment, configuration information including a port group virtual network interface card (VNIC) list and a mapping between at least one port group identifier and at least one existing virtual local area network (VLAN) identifier, wherein the vSwitch tags a network packet with a VLAN associated with the port group included in the configuration information;
   for an existing VLAN identifier from the configuration information, creating a separate intercept VLAN associated with an intercept VLAN identifier;
   adding the existing VLAN identifier, the intercept VLAN identifier, and an interface microservice to a VLAN trunk;
   modifying the configuration information to replace the existing VLAN identifier with the intercept VLAN identifier;
   receiving, from the vSwitch and as part of the VLAN trunk, the network packet from a virtual machine (VM) associated with the intercept VLAN; and
   determining whether the network packet matches a packet filter.

2. The method of claim 1, wherein the computing environment includes the hypervisor, and wherein the VM is running on the hypervisor.

3. The method of claim 1, further comprising:
   wherein the packet filter is one of a plurality of packet filters, and wherein the packet filter is associated with the intercept VLAN; and
   identifying the packet filter from the plurality of packet filters based on the association of the network packet with the same intercept VLAN.

4. The method of claim 1, further comprising modifying the VM to use the intercept VLAN for network traffic associated with the VM.

5. The method of claim 1, wherein the packet filter includes at least one filter criteria and a filter forward address.

6. The method of claim 1, wherein the packet filter includes at least one filter criteria and a filter forward address, and wherein the filter forward address identifies a network location including a security microservice.

7. The method of claim 1, wherein the packet filter includes at least one filter criteria and a filter forward address, and wherein the filter forward address indicates a network location to which to forward network packets matching the packet filter.

8. The method of claim 1, further comprising, in response to determining that the network packet matches the packet filter, sending the network packet to a security microservice which performs one or more security operations on the network packet.

9. The method of claim 1, further comprising, in response to determining that the network packet does not match the packet filter, modifying the network packet based on the existing VLAN identifier and forwarding the network packet to the existing VLAN.

10. The method of claim 1, wherein determining whether the network packet matches the packet filter includes determining one or more of: whether the network packet is associated with a defined port, whether the network packet is associated with a defined IP address, whether the network packet exceeds a threshold packet size, whether the network packet exceeds a threshold packet length, and whether the network packet contains a defined type of content.

11. The method of claim 6, wherein the security microservice is implemented using a container supporting a plurality of security operations including deep packet inspection and data loss prevention.

12. A non-transitory computer-readable storage medium storing instructions which, when executed by one or more processors, cause performance of:
   retrieving, from a virtual switch (vSwitch) corresponding to a hypervisor running in a computing environment, configuration information including a port group virtual network interface card (VNIC) list and a mapping between at least one port group identifier and at least one existing virtual local area network (VLAN) identifier, wherein the vSwitch tags a network packet with a VLAN associated with the port group included in the configuration information;
   for an existing VLAN identifier from the configuration information, creating a separate intercept VLAN associated with an intercept VLAN identifier;
   adding the existing VLAN identifier, the intercept VLAN identifier, and an interface microservice to a VLAN trunk;
   modifying the configuration information to replace the existing VLAN identifier with the intercept VLAN identifier;
   receiving, from the vSwitch and as part of the VLAN trunk, the network packet from a virtual machine (VM) associated with the intercept VLAN; and
   determining whether the network packet matches a packet filter.

13. The non-transitory computer-readable storage medium of claim 12, wherein the computing environment includes the hypervisor, and wherein the VM is running on the hypervisor.

14. The non-transitory computer-readable storage medium of claim 12, further comprising, in response to determining that the network packet matches the packet filter, sending the network packet to a security microservice which performs one or more security operations on the network packet.

15. The non-transitory computer-readable storage medium of claim 12, further comprising, in response to determining that the network packet does not match the packet filter, modifying the network packet based on the existing VLAN identifier and forwarding the network packet to the existing VLAN.

16. The non-transitory computer-readable storage medium of claim 12, wherein determining whether the network packet matches the packet filter includes determining one or more of: whether the network packet is associated with a defined port, whether the network packet is associated with a defined IP address, whether the network packet exceeds a threshold packet size, whether the network packet exceeds a threshold packet length, and whether the network packet contains a defined type of content.

17. An apparatus, comprising:
one or more processors;
a non-transitory computer-readable storage medium coupled to the one or more processors, the computer-readable storage medium storing instructions which, when executed by the one or more processors, causes the apparatus to:
retrieve, from a virtual switch (vSwitch) corresponding to a hypervisor running in a computing environment, configuration information including a port group virtual network interface card (VNIC) list and a mapping between at least one port group identifier and at least one existing virtual local area network (VLAN) identifier, wherein the vSwitch tags a network packet with a VLAN associated with the port group included in the configuration information;
for an existing VLAN identifier from the configuration information, creating a separate intercept VLAN associated with an intercept VLAN identifier;
add the existing VLAN identifier, the intercept VLAN identifier, and an interface microservice to a VLAN trunk;
modify the configuration information to replace the existing VLAN identifier with the intercept VLAN identifier;
receive, from the vSwitch and as part of the VLAN trunk, the network packet from a virtual machine (VM) associated with the intercept VLAN; and
determine whether the network packet matches a packet filter.

18. The apparatus of claim 17, wherein the computing environment includes the hypervisor, and wherein the VM is running on the hypervisor.

19. The apparatus of claim 17, further comprising, in response to determining that the network packet matches the packet filter, sending the network packet to a security microservice which performs one or more security operations on the network packet.

20. The apparatus of claim 17, further comprising, in response to determining that the network packet does not match the packet filter, modifying the network packet based on the existing VLAN identifier and forwarding the network packet to the existing VLAN.

21. The apparatus of claim 17, wherein determining whether the network packet matches the packet filter includes determining one or more of: whether the network packet is associated with a defined port, whether the network packet is associated with a defined IP address, whether the network packet exceeds a threshold packet size, whether the network packet exceeds a threshold packet length, and whether the network packet contains a defined type of content.

* * * * *